(12) United States Patent
Mills

(10) Patent No.: US 9,210,391 B1
(45) Date of Patent: Dec. 8, 2015

(54) SENSOR DATA RESCALER WITH CHROMA REDUCTION

(71) Applicant: Apple Inc., Cupertino, CA (US)

(72) Inventor: Christopher L. Mills, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/449,019

(22) Filed: Jul. 31, 2014

(51) Int. Cl.
*H04N 9/76* (2006.01)
*H04N 9/64* (2006.01)
*H04N 9/07* (2006.01)
*G06T 3/40* (2006.01)

(52) U.S. Cl.
CPC .............. *H04N 9/646* (2013.01); *G06T 3/4015* (2013.01); *H04N 9/07* (2013.01)

(58) Field of Classification Search
CPC . H04N 5/3458; H04N 2209/045; H04N 9/67; H04N 9/76
USPC ........................ 348/222.1, 272, 273, 277, 280; 382/162, 163, 166, 167
See application file for complete search history.

(56) References Cited

U.S. PATENT DOCUMENTS

| | | | |
|---|---|---|---|
| 7,659,930 B2 | 2/2010 | Wu | |
| 8,131,071 B2 | 3/2012 | Linzer | |
| 8,416,322 B2 | 4/2013 | Kasahara | |
| 8,446,484 B2 | 5/2013 | Muukki et al. | |
| 8,564,683 B2 | 10/2013 | Easwar et al. | |
| 8,698,885 B2 | 4/2014 | DiCarlo et al. | |
| 2011/0090380 A1 | 4/2011 | Cote et al. | |
| 2013/0004071 A1 | 1/2013 | Chang et al. | |
| 2013/0229395 A1 | 9/2013 | Mills et al. | |
| 2013/0322746 A1 | 12/2013 | Cote et al. | |
| 2013/0322753 A1* | 12/2013 | Lim et al. | 382/167 |
| 2014/0118582 A1 | 5/2014 | Artyomov et al. | |
| 2014/0133749 A1* | 5/2014 | Kuo et al. | 382/167 |

OTHER PUBLICATIONS

U.S. Appl. No. 12/137,481, filed Jun. 11, 2008, Ronald G. Siemens.

* cited by examiner

*Primary Examiner* — Tuan Ho
(74) *Attorney, Agent, or Firm* — Robert C. Kowert; Meyertons, Hood, Kivlin, Kowert & Goetzel, P.C.

(57) ABSTRACT

An input rescale module for an image signal processor (ISP) that downscales sensor data in the horizontal and vertical dimensions. The module may demosaic the sensor data to generate RGB data. Horizontal filtering may be applied to horizontally downsize the RGB data. The RGB data is converted to YCC, chroma 4:4:4. The chroma 4:4:4 is then horizontally filtered to generate chroma 4:2:2. Dropping chrominance data by going to 4:2:2 may reduce hardware area cost and power usage in the vertical scaler. Vertical filtering may be applied separately to luma and chroma to vertically downsize the YCC data. Chroma may be filtered with stronger filters than luma. The chroma 4:2:2 data may then be horizontally interpolated to generate chroma 4:4:4 data. The YCC data is converted back to RGB, and the RGB data is remosaiced to generate downsampled sensor format data.

20 Claims, 12 Drawing Sheets input rescale
304

GNU detection kernel 900

US 9,210,391 B1

SENSOR DATA RESCALER WITH CHROMA REDUCTION

BACKGROUND

Image data captured by an image sensor is often initially processed as part of an image processing pipeline in order to prepare the captured image data for further processing or consumption. In this way, real-time corrections and/or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections and/or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

Embodiments of an input rescale method and module that may perform cross-color correlated downscaling of sensor data in the horizontal and vertical dimensions. An input rescale module may perform a first-pass demosaic of sensor data (e.g., Bayer format data), perform cross-color correlated downscaling using horizontal and vertical scalers, and then remosaic the data to provide vertically and horizontally downscaled sensor data (e.g., Bayer format data) as output for additional image processing. The input rescale module may, for example, act as a front end scaler for an image signal processor (ISP) to preprocess sensor data (e.g., Bayer format data) input to produce sensor data (e.g., Bayer format data) output at a reduced resolution for additional processing by the ISP pipeline. The reduction in data provided by the input rescale may, for example, allow the ISP to produce high-quality output at reduced resolution (e.g., video format resolution) from a high-pixel-count photosensor.

In at least some embodiments of an input rescale module, the sensor format data (e.g., Bayer format data) may be demosaiced to generate RGB color space data. Horizontal filtering may be applied to resample and downsize the RGB data in the horizontal direction. The RGB output from the horizontal filter is converted to YCC, chroma 4:4:4 format. The chroma 4:4:4 is then horizontally filtered and decimated to generate chroma 4:2:2 output. Vertical filtering may then be applied separately to the luma and chroma components to resample and downsize the YCC data in the vertical direction. The chroma 4:2:2 data may then be horizontally interpolated to generate chroma 4:4:4 data. The YCC data is then converted back to RGB, and the RGB data is then remosaiced to generate vertically and horizontally downsampled sensor format data (e.g., Bayer format data) for output to the ISP pipeline.

In some embodiments, converting to YCC color space may allow the input rescale module to drop half of the chrominance data by going to chroma 4:2:2 format. This, for example, reduces the area cost of hardware in the vertical scaler of the input rescale module, as well as reducing power needed to process the pixels.

In some embodiments, converting to YCC color space allows the luminance and chrominance components to be processed separately by the vertical scaler. In some embodiments, since the chrominance and luminance components are separated in the YCC color space, the chrominance data may be filtered with stronger filters than the luminance data, for example to reduce false color artifacts without reducing the edge sharpness provided by the luminance data.

Figure 1:
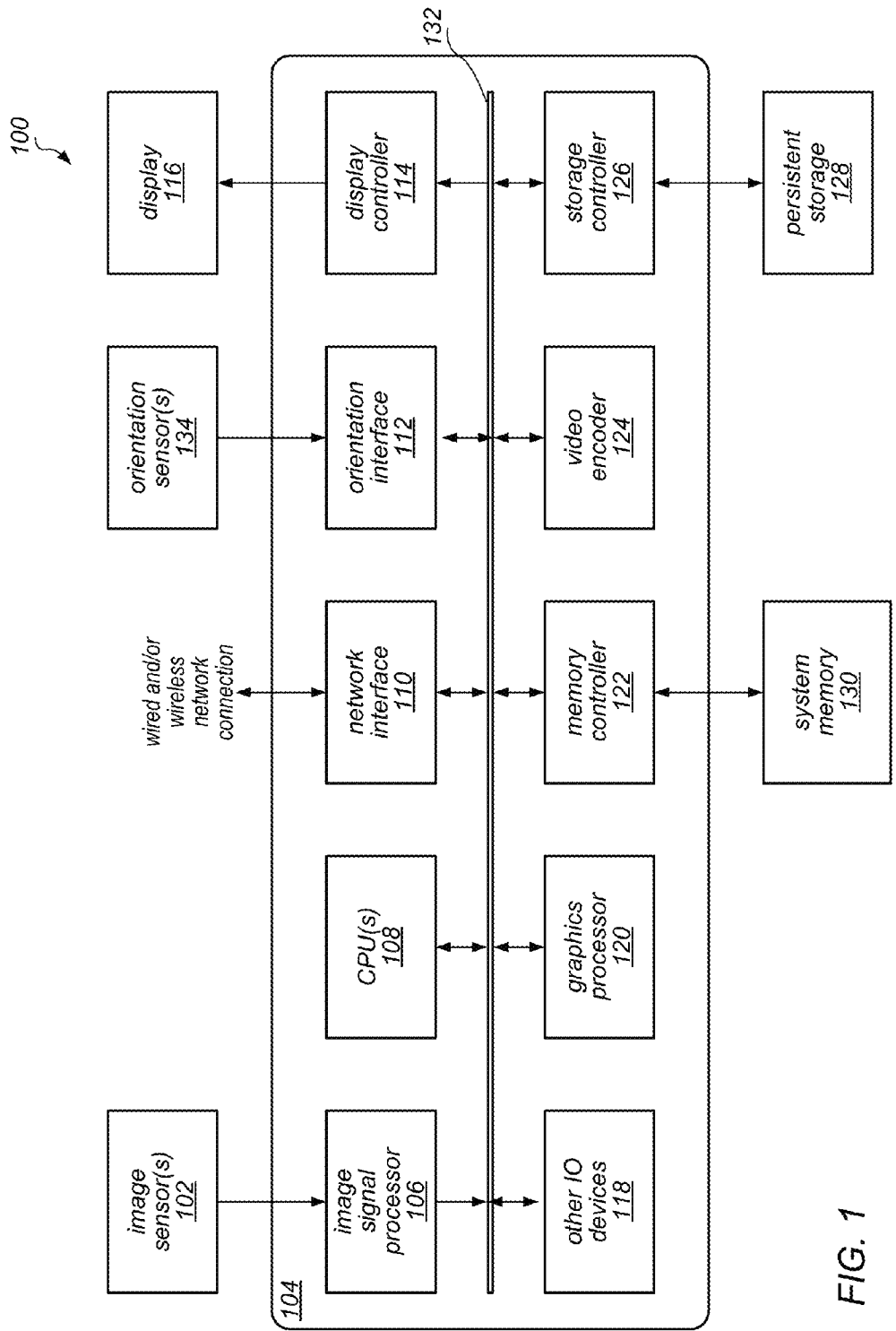
FIG. 1 is a block diagram illustrating a system that may implement an image signal processor, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112 paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 7:
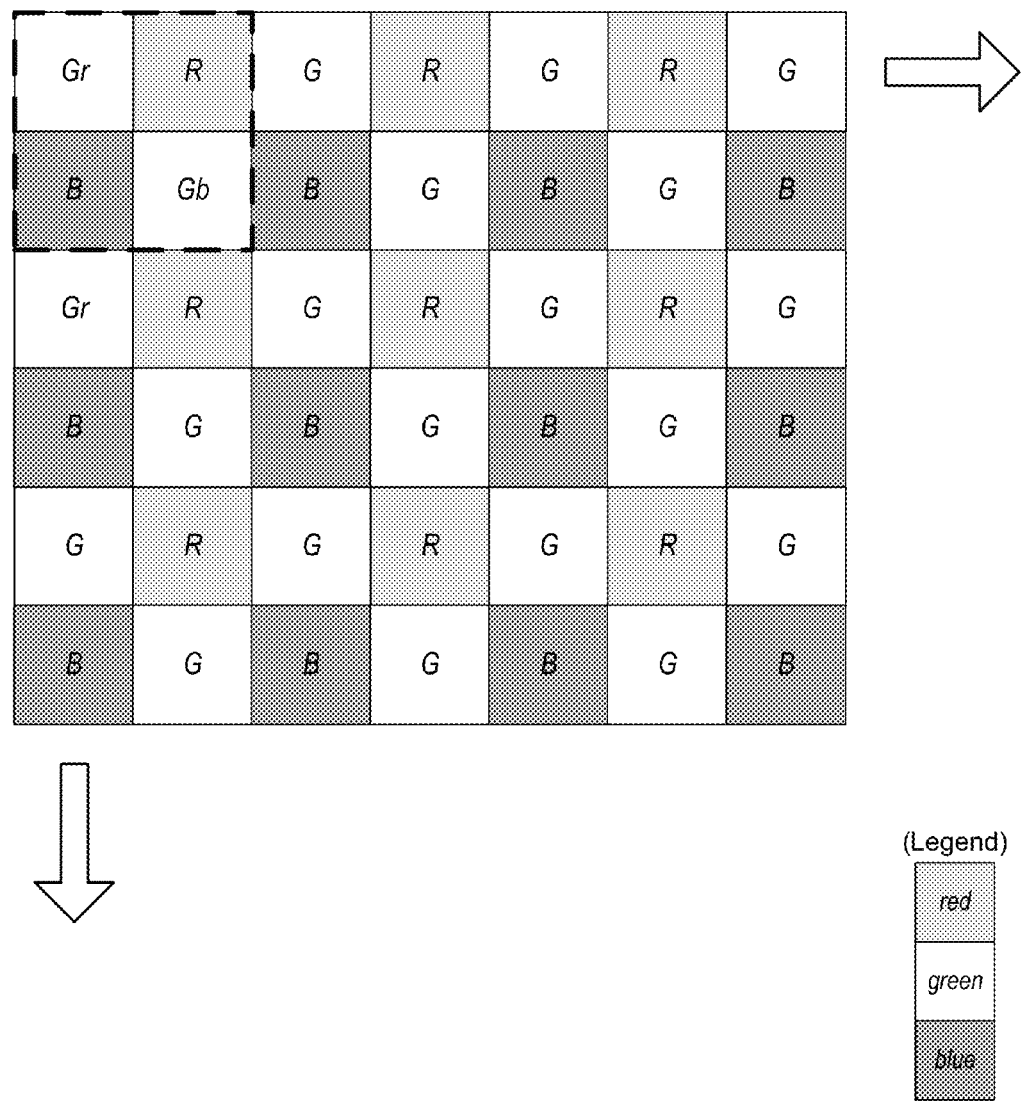
FIG. 7 illustrates a portion of a Bayer pattern.

Various embodiments of methods and apparatus for rescaling sensor data for image signal processing are described. Image sensors, also referred to as photosensors, that are used in digital cameras typically have native pixel resolution of 8 megapixels or more; 8, 10, 12, or higher megapixel photosensors may be used, even in small form factor cameras for integration in small, mobile multipurpose devices such as smartphones and tablet or pad devices. As a general rule, capturing more pixels provides more raw image data, and more raw image data may allow higher quality images, or at least higher resolution images to be generated as output. In addition, the photosensors used in many digital cameras are constructed so that different pixels capture different colors, for example using color filter arrays (CFAs). An example is the Bayer array photosensor or Bayer pattern for RGB colors. FIG. 7 illustrates a portion of a Bayer pattern. In a Bayer array photosensor, the pixels may be arranged in 2×2 squares, for example in a (Gr,R,B,Gb) pattern as shown in FIG. 7 with one red pixel, two green pixels, and one blue pixel. Note that other photosensors may be configured to capture other types of colors than RGB color, or may exhibit different patterns of pixels; the Bayer array and pattern as illustrated in FIG. 7 is just one example.

Some digital imaging applications may produce high-resolution output images of similar resolution as the raw sensor resolution. For example, still image production techniques may take 10 megapixel sensor data as input and generate high-resolution, 8-10 megapixel output images. However, other digital imaging applications produce lower-resolution images as output from the sensor data captured at the native sensor resolution. For example, video capture techniques typically generate video frames in video formats of 2 megapixels or less. A non-limiting example video format is 1080p (1920×1080 pixels, 2.1 megapixels). Moreover, many digital cameras are used as single cameras in multipurpose devices to capture image data for multiple digital imaging applications, including but not limited to video applications. For example, digital cameras used in multipurpose devices such as smartphones and tablet or pad devices may be used in applications to capture both high-resolution still images and video clips.

Thus, Bayer-format images captured by a photosensor at the native sensor resolution (referred to as sensor images or sensor data) may need to be downsized for many digital imaging applications, for example from 8 megapixels or more native sensor resolution input to around 2 megapixels or less for video format output. Conventional solutions for downsizing CFA (e.g., Bayer) format sensor data have included Bayer binning techniques, which may produce noticeable binning artifacts, and Bayer color resampling, which loses resolution. Moreover, these conventional techniques generally work on the color channels separately, and do not perform much if any cross-color correlation. Solutions for downscaling have also included brute-force ISP solutions that process images at the native sensor resolution (at a high cost of bandwidth, power and circuit area) before finally resizing the processed images to the target resolution at or near the end of the ISP pipeline.

Embodiments of an input rescale method that may perform cross-color correlated downscaling in the horizontal and vertical dimensions, and of an input rescale module that implements the input rescale method, are described that may provide higher quality image output when compared with conventional downsizing techniques by performing a first-pass demosaic of the sensor data (e.g., Bayer format data), performing cross-color correlated downscaling using horizontal and vertical scalers, and then remosaicing the data to provide sensor data (e.g., Bayer format data) as output for additional image processing. An input rescale module may, for example, act as a front end scaler for an image signal processor (ISP) to preprocess sensor data (e.g., Bayer format data) input to produce sensor data (e.g., Bayer format data) output at a reduced resolution for additional processing by the ISP pipeline. The reduction in data provided by the input rescale module may allow the ISP to produce high-quality output at reduced resolution (for example, for video formats or smaller-resolution still images) from a high-pixel-count photosensor. For example, the input rescale module may convert Bayer format data from native sensor resolution (typically 8 megapixels or more) to video resolutions (typically 2 megapixels or less) by doing a rescale of the captured image data in the Bayer domain.

In at least some embodiments, the first-pass demosaic performed by the input rescale module may be simplified due to the fact that the downstream result will be downscaled by the horizontal and vertical scalers. Since the horizontal and vertical scalers discard much of the data, a simple demosaic of lower quality than a typical demosaic performed in an ISP pipeline may be performed, for example a demosaic function that works on 3×3 blocks of pixels rather than 5×5 blocks as in typical ISP pipeline demosaic functions.

In at least some embodiments, the nature of the color filter array (CFA) of the photosensor (e.g., a Bayer CFA) may be leveraged to allow one or more functions performed by the input rescale module prior to the horizontal and vertical scalers (for example, handling pixel defects, filtering around highlight regions, and the demosaic operation) to run at two pixels per clock (ppc) without a significant increase in hardware cost. Since each CFA (e.g., Bayer) pixel pair is composed of a green and a non-green (red or blue) pixel, each pair may be processed in two processing paths, one path for a green pixel and one path for a non-green pixel. Since the processing for each type of pixel may be different, there is no additional area cost for a one- or two-ppc implementation. Thus, the front end of the input rescale module may receive and process sensor data at two-ppc. In at least some embodiments, the horizontal filter reduces the sensor data down to one-ppc for downstream components of the input rescale module and for the ISP pipeline.

In at least some embodiments of the input rescale module, the demosaic operation generates RGB pixel data, and the horizontal scaler applies horizontal filtering to the RGB data to horizontally downscale the image. In the vertical scaler, the RGB output of the horizontal filter operation may be converted to a color space that separates luminance and chrominance (e.g., a YCC color space, also referred to as YCbCr), and the chroma portion of the YCC data may be reduced from chroma 4:4:4 to chroma 4:2:2. Vertical filtering is then applied separately to the luma and chroma data to vertically downscale the image. The chroma 4:2:2 data is then converted back to chroma 4:4:4, the YCC data is converted back to RGB data, and the RGB data is remosaiced to generate Bayer format data as output.

In at least some embodiments, converting to YCC color space allows the module to drop half of the chrominance data (by going to 4:2:2). This, for example, reduces the area cost of hardware (e.g., line buffers) in the vertical scaler of the input rescale module, as well as reducing power needed to process the pixels. Since format of the output of an ISP may be YCC 4:2:0 or 4:2:2 as generally required by video codecs, the reduction in bandwidth in the input rescale module may not adversely affect the resulting image quality.

In at least some embodiments, splitting the signal into luminance and chrominance components by converting to YCC color space allows the luminance and chrominance components to be processed separately by the vertical scaler. A primary artifact introduced by the demosaic operation is false colors. In at least some embodiments, since the chrominance and luminance components are separated in the YCC color space, the chrominance data may be filtered with stronger filters than the luminance data, for example to reduce false color artifacts without reducing the edge sharpness provided by the luminance data.

The techniques described herein for rescaling sensor data for image signal processing may be further illustrated in terms of an example system that employs them. These techniques may be implemented in any type of camera, apparatus, device, or computing system that includes the capability to obtain and process image data captured by a photosensor, including but not limited to video data and still image data.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes an image sensor 102, a system-on-a-chip (SOC) component 104, system memory (e.g., DRAM) 130, persistent storage (e.g., flash memory) 128, and a display 116 (e.g., LCD). In this example, image sensor 102 may be any type of image sensor suitable for capturing image data (e.g., an image sensor that is responsive to captured light), such as an active-pixel sensor (e.g., complementary metal-oxide-semiconductor (CMOS) active-pixel sensor) or charge-coupled device (CCD) photosensor on a camera, video camera, or other device that includes a camera or video camera. In this example, display 116 may be configured to display a preview of captured still images and/or or video clips. Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, smart phone, cell phone, pager, personal data assistant (PDA), tablet or pad device, or music/media player; an I/O device such as a digital camera, a scanner, a video recorder; a consumer device; a video game console; a handheld video game device; or in general any type of computing or electronic device that may include the functionality of a camera and/or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, super-pipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 130 may be executed by CPU 108 and/or GPU 120 to provide various functions of system 100. In other embodiments, various functions may be performed by software components executing in memory on another device and communicating with the illustrated system via inter-computer communication. Some or all of these software components and/or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
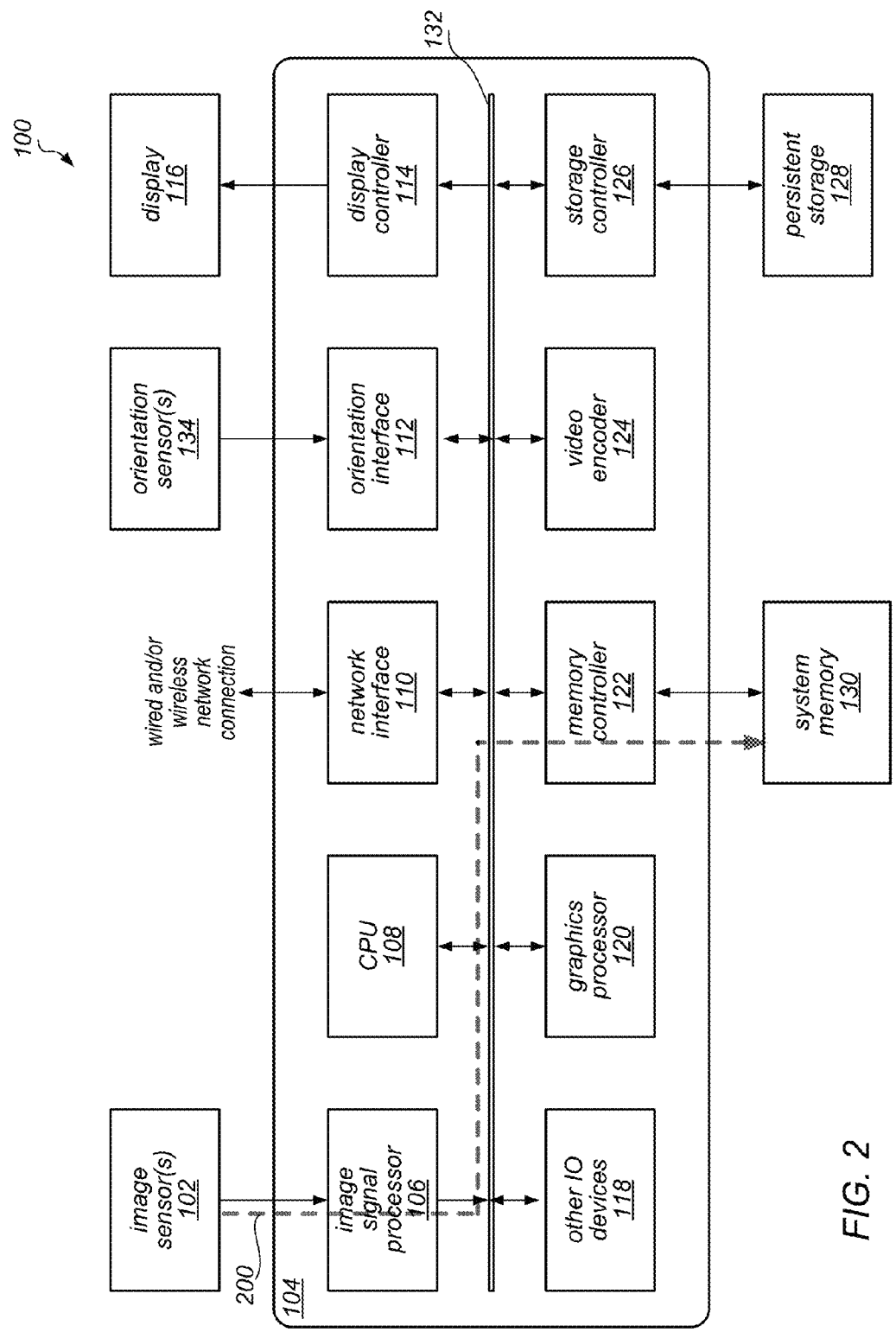
FIG. 2 is a block diagrams illustrating various data paths in a system that implements an image signal processor, according to at least some embodiments.

FIG. 2 is a block diagram illustrating a data path in a system that implements an image signal processor (specifically, in system 100 illustrated in FIG. 1), according to some embodiments. As illustrated by the dashed lines in this example, image data may pass from the image sensor (102), through the image signal processor (106) to system memory 130 (by way of interconnect 132 and memory controller 122). Once the image data has been stored in system memory 130, it may be accessed by video encoder 124 or display 116 (e.g., by way of interconnect 132 and, in the case of display 116, display controller 114). For example, image data may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

In some embodiments graphics processor 120 may access, manipulate, transform and/or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, and/or display controller 114) without storing the image data to system memory 130.

Figure 3:
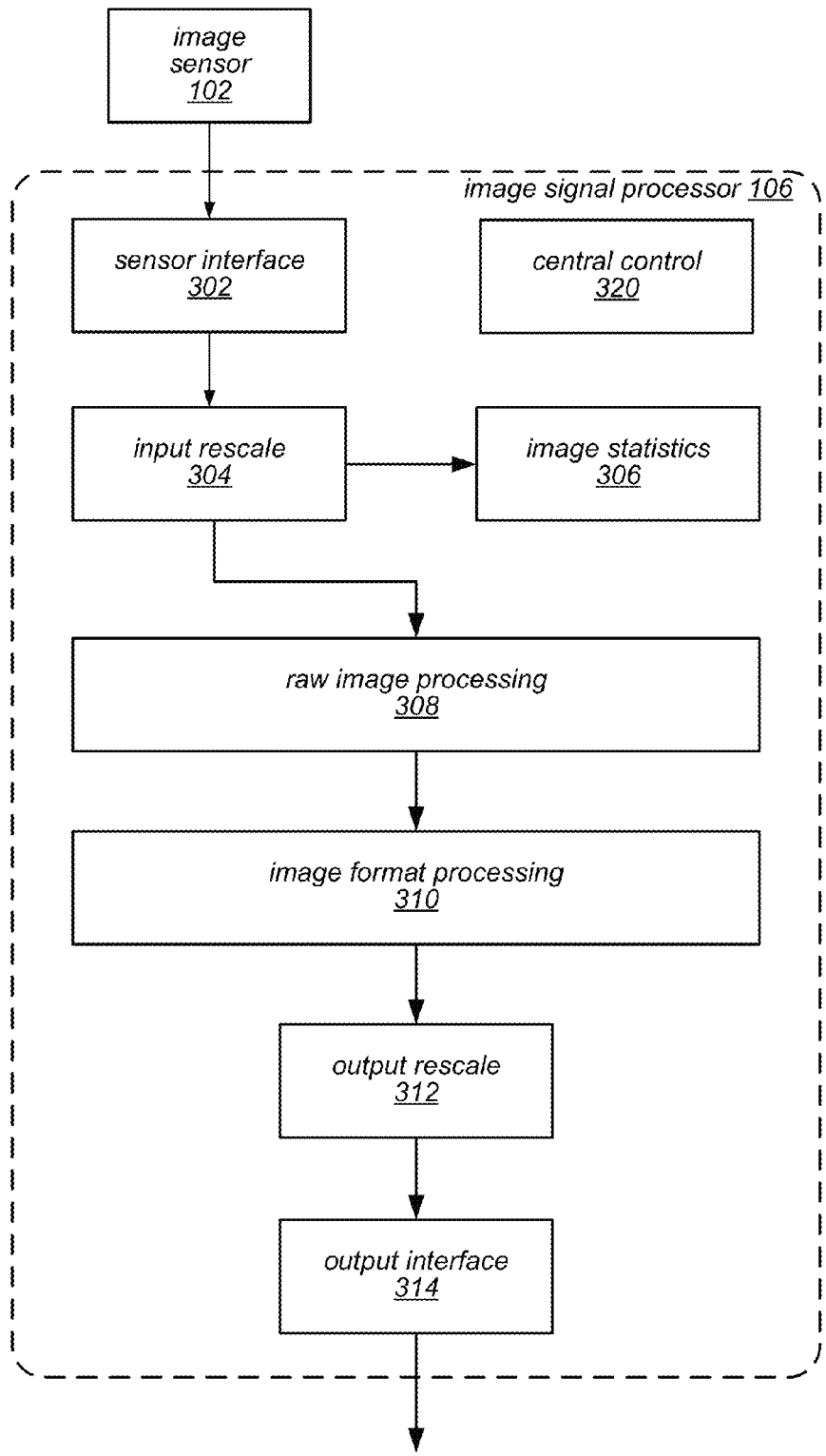
FIG. 3 is a block diagram illustrating an example image signal processor, according to at least some embodiments.

One embodiment of an image signal processing unit (ISP), such as image signal processor 106, is illustrated by the block diagram in FIG. 3. As illustrated in this example, ISP 106 may in various embodiments be coupled to an image sensor 102 (from which it receives image data). In this example, ISP 106 implements an image pipeline, i.e., a set of stages that process image information from creation (or capture) to output. For example, the various elements illustrated as components of the ISP 106 pipeline may process source data received from image sensor 102 through sensor interface 302 into image data usable by other stages in the ISP 106 pipeline (e.g., input rescale 304, image statistics 306, raw image processing 308, image format processing 310 or output rescale 312), by other components of a system that includes ISP 106 via output interface 314 (including those that access the transformed data from the system memory after it is written to the system memory via memory controller interface 122 or are provided the image data via interconnect 132 directly), and/or by other devices coupled to the system that includes ISP 106. Note that in some embodiments, the image signal processor 106 is a streaming device. In other words, pixels may be received by the image signal processor 106 from the image sensor 102 in raster order (i.e., horizontally, line by line) and may in general be processed through its various pipeline stages in raster order, until finally being output in raster order.

In various embodiments, image signal processor 106 may implement central control module 320. Central control module 320 may configure and start the processing of image data, in some embodiments. For example, central control module may implement performance monitors for logging clock cycles, memory latency, quality of service, and state information. Central control module 320 may update or manage control parameters for units, modules, stages, and/or other components of ISP 106, and may interface with sensor interface 302 to control the starting and stopping of the of the units, modules, stages, and/or other components. For example, in some embodiments, a unit, module, stage, and/or other component may go into an idle state during which programmable parameters may be updated by central control module 320. The unit, module, stage, and/or other component may then be placed into a run state, to perform one or more operations or tasks.

In various embodiments, ISP 106 may implement input rescale module 304. The input rescale module 304 operates on sensor (e.g., Bayer format) data, producing sensor (e.g., Bayer) output at a reduced resolution for the rest of the ISP 106 pipeline, which may reduce the power and bandwidth cost of image processing at the later stages, units, and/or modules of the ISP 106 pipeline when processing images to be output at lower resolutions than the full sensor resolution. The reduction in data provided by the input rescale module 304 may enable the ISP 106 pipeline to produce high-quality output at reduced resolutions (for example, for video or smaller-resolution still images) from a high-pixel-count sensor. For example, the input rescale module 304 may convert Bayer format data from native sensor resolution (typically 8 megapixels or more) to video resolutions (typically 2 megapixels or less) by doing a rescale of the sensor data in the Bayer domain.

In some embodiments, input rescale module 304 may demosaic Bayer format image data received from image sensor 102, apply horizontal and vertical filtering to resample the image data, and then remosaic the resampled image data to generate downscaled Bayer format image data output for the remainder of the ISP 106 pipeline. In some embodiments of an input rescale module 304, the demosaic operation generates RGB pixel data, and horizontal filtering is applied to the RGB data to horizontally downscale the image. In some embodiments, input rescale module 304 may perform additional processing before and after the demosaic operation to, for example, handle pixel defects and filtering around highlight regions. In at least some embodiments, the RGB output of the horizontal filter operation may be converted to YCbCr, and the chroma portion of the YCbCr data may be reduced from chroma 4:4:4 to chroma 4:2:2. Vertical filtering may then be applied separately to the luma and chroma data to vertically downscale the image. The chroma 4:2:2 data is then converted back to chroma 4:4:4, the YCbCr data is converted back to RGB data, and the RGB data is remosaiced to generate Bayer format data as output. In some embodiments, the vertical filtering path may be bypassed, and the RGB output of the horizontal filter operation may be remosaiced to generate Bayer format data as output.

In some embodiments of an ISP 106, the input rescale module 304 may be bypassed, or may be directed to perform a lesser amount of resolution reduction, to allow the ISP 106 pipeline to process captured image data at higher resolutions, for example for higher-quality still image photography. In some embodiments, the input rescale module 304 may perform some reduction in resolution for an image at the front of the ISP 106 pipeline. The ISP 106 pipeline may then process the image at the reduced resolution. At a later stage of the pipeline, for example at output rescale module 312, the image resolution may be further reduced to generate an image at a desired or required output resolution.

In various embodiments, image signal processor 106 may implement image statistics module 306. Image statistics module 306 may perform various functions and collect information. For example, in some embodiments, image statistics module 306 may perform sensor linearization, defective pixel replacement, black level compensation, lens shading correction, and inverse black level compensation, collecting image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting.

In various embodiments image signal processor 106 may implement raw image processing module 308. Raw image processing module 308 may, in various embodiments implement a variety of modules, units, and/or components to perform various operations, functions, or tasks on raw image data (e.g., Bayer format), in different orders, such as sensor linearization, black level compensation, fixed pattern noise reduction, temporal filtering, defective pixel correction, spatial noise filtering, lens shading correction, white balance gain, highlight recovery, and/or raw scaling. A sensor linearization unit may, in some embodiments, map non-linear image data to linear space. Black level compensation may be performed to provide digital gain, offset and clip independently for each color component (e.g., (Gr,R,B,Gb) of a Bayer pattern as shown in FIG. 7) on the pixels image data (which may occur after sensor linearization). Fixed pattern noise reduction may be performed to remove offset fixed pattern noise and gain fixed pattern noise by subtracting a dark frame from an input image and multiplying different gains to pixels, in some embodiments. Temporal filtering may perform noise filtering based on pixel values from previously processed image frames (referred to as reference frames). Defective pixel correction may determine or identify defective pixels, and may replace defective pixel values. Spatial noise filtering may reduce noise in image data by averaging neighbor pixels that are similar in brightness. Lens shading correction may apply a gain per pixel to compensate for a drop-off in intensity roughly proportional to a distance from a lens optical center. White balance gains may provide digital gains for white balance, offset and clip independently for all color components (Gr,R,B,Gb). Highlight recovery may estimate pixel values for those pixels that are clipped (or nearly clipped) from other channels. Raw scaling may scale down image data in a raw format (e.g., Bayer format). Note that various examples and descriptions provided above are not intended to be limiting as to the various techniques or components implemented as part of raw image processing, but are instead merely provided as examples.

As noted above, in at least some embodiments, a temporal filter module, unit, or component may be implemented as part of raw image processing module 308. The temporal filter may perform noise filtering based on pixel values from a reference image frame. In some embodiments, the temporal filter may introduce a frame delay into the image processing pipeline of ISP 106 by providing the reference image frame instead of the current image frame. The frame delay may allow downstream processes, units, stages, or components time to gather more information for better analysis of image data, as well as allow downstream processes to be programmatically tailored to the image data. In various embodiments, the temporal filter may perform filtering based on a generated blending value for each pixel on a current image frame that is based on differences determined between neighboring pixels in the current image frame and a reference image frame. In some embodiments, the temporal filter may adjust blending values for pixels based on noise history maintained for the pixels. In some embodiments, the temporal filter may implement dynamic motion estimation and compensation for image data as it is received on the fly, so that a reference image frame may be shifted to align with a current frame before filtering.

In various embodiments, image signal processor 106 may implement image format processing module 310. Image format processing module 308 may, in various embodiments implement a variety of modules, units, and/or components to perform various operations, functions, or tasks, in different orders, such as demosaicing raw image data to RGB image format, local tone mapping, determining gain/offset/clip, color correction, 3D color lookup, RGB gamma mapping, color space conversion (e.g., RGB to YCbCr), statistics collection, luma sharpening, chroma suppression, dynamic range compression, brightness, contrast and color adjustments, YCbCr gamma mapping, chroma decimation and chroma noise reduction. Demosaicing may interpolate missing color samples in image data. Local tone mapping may apply spatially varying local tone curves to image data. Gain, offset, and clip may be determined for each color channel in RGB image data. Color correction may be performed using an RGB color correction matrix. RGB gamma mapping may provide a mapping between RGB values using a lookup table for gamma correction. Color space conversion may convert image data to another color format or space (e.g., RGB to YCbCr). Luma sharpening may sharpen luma values. Chroma suppression may attenuate chroma to gray (i.e. no color). Noise in chrominance channels may be filtered. Note that various examples and descriptions provided above are not intended to be limiting as to the various techniques or components implemented as part of image format processing, but are instead merely provided as examples.

In various embodiments, image signal processor 106 may implement output rescale module 312. Output rescale module 312 may resample, transform and correct distortion on the fly as the ISP 106 processes image data. Output rescale module 312 may compute a fractional input coordinate for each pixel and use this fractional coordinate to interpolate an output pixel via a polyphase resampling filter, in some embodiments. A fractional input coordinate may be produced from a variety of possible transforms of an output coordinate, such as resizing and/or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbation to a coordinate to account for a radial lens distortion).

Output rescale module 312 may, in various embodiments, apply transforms to image data as it is processed at output rescale module 312. Output rescale module 312 may include horizontal and vertical scaler components. The vertical portion of the design may implement a series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 312 may statistically monitor computed input Y coordinates over previous lines and use it to compute an optimal set of lines to hold in the vertical support window. For each subsequent line, output rescale module 312 may generate a best guess of where to center the vertical support window automatically. In some embodiments, output rescale module 312 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame.

Note also that, in various embodiments, the functionally of units 302-314 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-12) may be implemented in various combinations of hardware and/or software.

Input Rescale Method and Module

As noted above, an input rescale module may be implemented as a front end scaler for an image signal processor (ISP), such as ISP 106 described above with regard to FIG. 3, to preprocess sensor data (e.g., Bayer format data) input to produce sensor data (e.g., Bayer format data) output at a reduced resolution for additional processing by the ISP pipeline, which may reduce the power and bandwidth cost of image processing at the later stages, units, and/or modules of the ISP pipeline when processing images to be output at lower resolutions than the full sensor resolution. The input rescale module may implement an input rescale method that may perform cross-color correlated downscaling of the sensor data in the horizontal and vertical dimensions. The reduction in data provided by the input rescale module and method may enable the ISP pipeline to produce high-quality output at reduced resolutions (for example, for video or smaller-resolution still images) from a high-pixel-count sensor. For example, the input rescale module may convert Bayer format data from native sensor resolution (typically 8 megapixels or more) to a video resolution (typically 2 megapixels or less) by doing a rescale of the sensor data in the Bayer domain.

Figure 4:
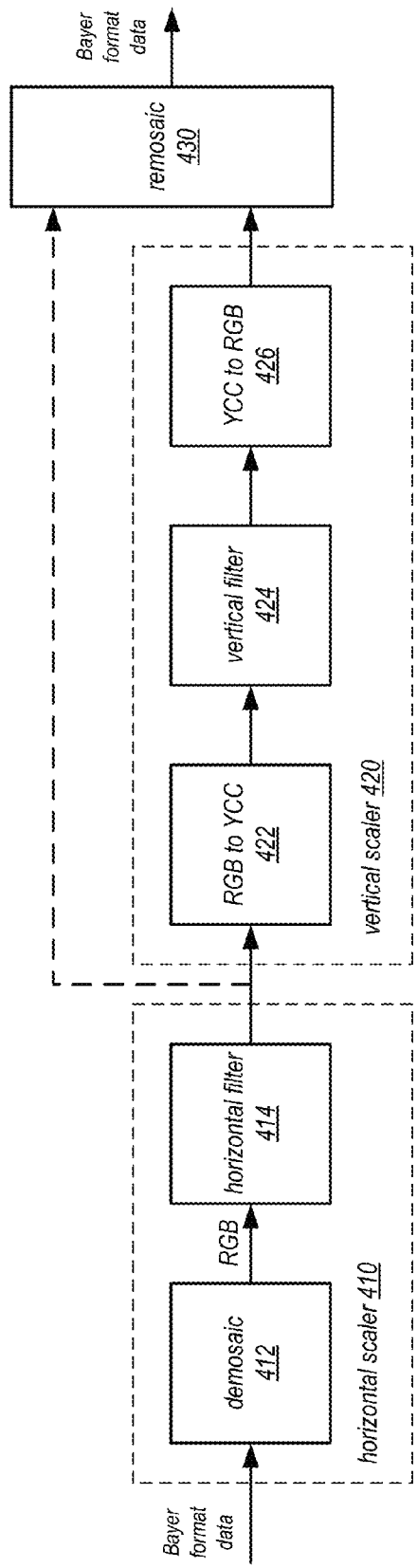
FIG. 4 is a high-level block diagram of an example input rescale module, according to at least some embodiments.
Figure 11:
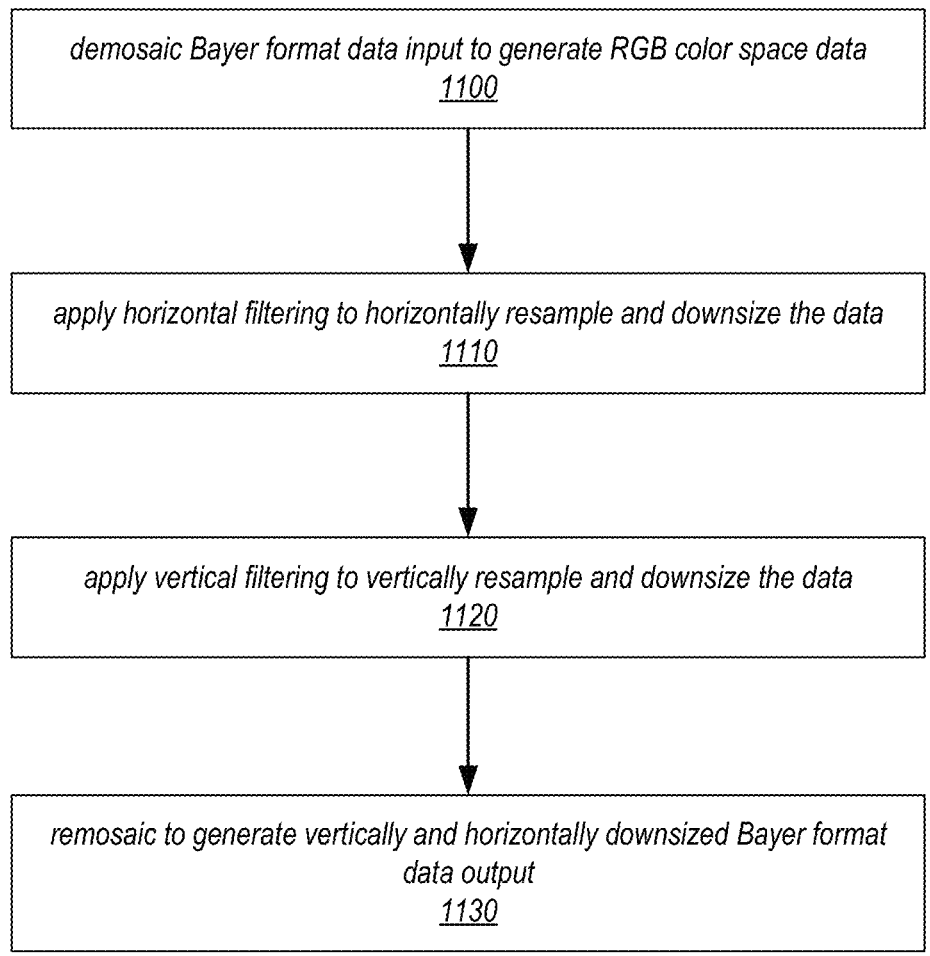
FIG. 11 is a high-level flowchart of a method for rescaling sensor data for image signal processing, according to at least some embodiments.

FIG. 4 is a high-level block diagram of an example input rescale module 304, according to at least some embodiments. Input rescale module 304 may include, but is not limited to, a horizontal scaler 410 path, a vertical scaler 420 path, and a remosaic 430 component. Horizontal scaler 410 may include, but is not limited to, a demosaic 412 component or stage and a horizontal filter 414 component or stage. Vertical scaler 420 may include, but is not limited to, an RGB to YCC 422 component, a vertical filter 424 component, and a YCC to RGB 426 component. Horizontal scaler 410 may receive sensor data, apply a demosaic 412 operation to convert the sensor data to RGB format, and apply horizontal filtering at horizontal filter 414 to horizontally resample and downsize the image data. The horizontally downsized RGB format data may be output to vertical scaler 420, which vertically resamples and downsizes the image data. A remosaic 430 operation may then be performed to convert the RGB format data back to the sensor format for processing by the ISP 106 pipeline. FIG. 11 is a high-level flowchart of a method for rescaling sensor data for image signal processing, according to at least some embodiments. The method may, for example, be implemented as or in an input rescale 304 component as illustrated in FIGS. 3 and 4.

As indicated at 1100 of FIG. 11, Bayer format data may be demosaiced to generate RGB color space data. In at least some embodiments, a demosaic 412 component of horizontal scaler 410 may receive sensor data in a format (e.g., a Bayer pattern or format for RGB colors) that represents different color channels (e.g., red, green, and blue) as separate pixels or color components (e.g., (Gr,R,B,Gb)) as captured by an image sensor, and perform a demosaic operation to output RGB format data. The sensor data may be captured data received from an image sensor of a camera on a device or apparatus that includes the input rescale module 304, or may be previously stored sensor data read from a memory. In at least some embodiments, the demosaic operation performed by the demosaic 412 component may be a relatively simple demosaic, for example a demosaic function that works on 3×3 blocks of pixels rather than 5×5 blocks, since the results will be downscaled by the horizontal 414 and vertical 424 filters.

As indicated at 1110 of FIG. 11, horizontal filtering may be applied to horizontally resample and downsize the data. In at least some embodiments, a horizontal filter may be applied to the RGB format data by horizontal filter 414 component to horizontally resample and downsize the data. The horizontally downsized RGB format data may, for example, be output to a vertical scaler 420 pipeline.

As indicated at 1120 of FIG. 11, vertical filtering may be applied to vertically resample and downsize the data. In some embodiments, to vertically downsize the image on the vertical scaler 420 path, RGB to YCC 422 component may receive the RGB format data from horizontal scaler 410 and convert the RGB data to YCC format to separate the pixel data into luminance and chrominance components. Vertical filter 424 component may then apply vertical filtering separately to the luma and chroma data. YCC to RGB 424 component then converts the downsized YCC format data back to RGB format.

Converting to YCC color space allows vertical filter 424 to apply different filters to the luma and chroma data so that false colors that may be introduced by the demosaic 412 operation may be corrected using stronger filters without adversely affecting edges. In addition, converting to YCC color space may allow the vertical scaler 420 to drop half of the chrominance data by converting the chroma data from chroma 4:4:4 to chroma 4:2:2 prior to vertical filtering of the chroma data. This, for example, may reduce the area cost of hardware (e.g., line buffers) in the vertical scaler 420, as well as reducing power needed to process the pixels in vertical scaler 420. Thus, in some embodiments of a vertical scaler 420, the chroma data may be converted from YCC 4:4:4 to YCC 4:2:2 prior to applying vertical filtering to the chroma data, and converted back to YCC 4:4:4 after applying vertical filtering to the chroma data.

As indicated at 1130 of FIG. 11, after vertically resampling and downsizing the data, the data may be remosaiced to generate vertically and horizontally downsized Bayer format data output for the ISP 106 pipeline. In at least some embodiments, the horizontally and vertically downsized RGB format data is output from vertical scaler 420 to remosaic 430 component, which converts the RGB data back to sensor format (e.g., Bayer format) for output to the ISP 106 pipeline.

In at least some embodiments, as an alternative as shown by the dashed line, the vertical scaler 420 may be bypassed, and the horizontally downsized RGB format data may be sent to the remosaic 430 component to be converted back to sensor format (e.g., Bayer format) data for output to the ISP 106 pipeline. While not shown, in some embodiments the RGB output of the horizontal scaler 410 and/or of the vertical scaler 420 may be output to other destinations instead of or in addition to the remosaic 430 component, for example to a display controller 114 or system memory 130 as illustrated in FIG. 1. In some embodiments, the input rescale module 304 may be bypassed, or may be directed to perform a lesser amount of resolution reduction, to allow the ISP 106 pipeline to process captured image data at higher resolutions, for example for higher-quality still image photography. In some embodiments, the input rescale module 304 may perform some reduction in resolution for an image at the front of the ISP 106 pipeline. The ISP 106 pipeline may then process the image at the reduced resolution. At a later stage of the pipeline, for example at output rescale module 312, the image resolution may be further reduced to generate an image at a desired or required output resolution.

In some embodiments, input rescale module 304 may perform some preprocessing of the sensor data before or at demosaic 412 component, for example handling pixel defects and filtering around highlight regions. Each Bayer pixel pair is composed of a green and a non-green (red or blue) pixel. Since the processing for each type of Bayer pixel may be different, there is no additional area cost for a one- or two-pixel per clock (ppc) implementation. Thus, in at least some embodiments, at least one functional component of the input rescale module 304 that processes sensor data prior to horizontal filter 414 may receive and process the sensor data at two-ppc. In at least some embodiments, the horizontal filter 414 reduces the sensor data down to one-ppc for downstream components or stages of the input rescale module 304 and for the ISP 106 pipeline.

Input Rescale Module Details

Figure 12:
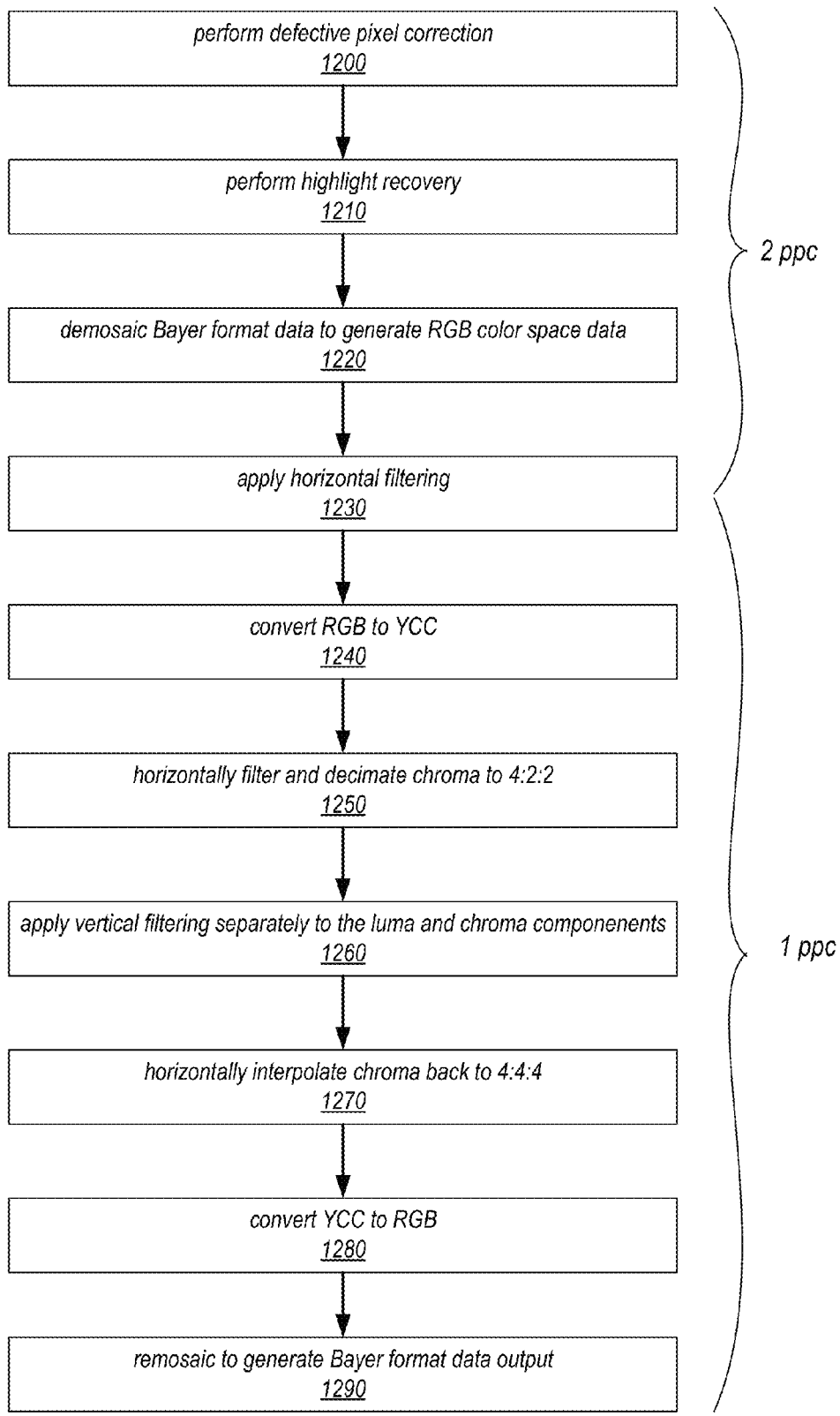
FIG. 12 is a more detailed flowchart of a method for rescaling sensor data for image signal processing, according to at least some embodiments.

FIG. 12 is a more detailed flowchart of a method for rescaling sensor data for image signal processing, according to at least some embodiments. This method may be implemented in an input rescale module 304, for example the input rescale module 304 illustrated in FIG. 5, to perform cross-color correlated downscaling of input sensor format data (e.g., Bayer format data) in the horizontal and vertical dimensions prior to processing in an ISP pipeline. As indicated at 1200, defective pixels in the input sensor format data (e.g., Bayer format data) may be detected and corrected. In some embodiments, green non-uniformity (GNU) may also be detected. As indicated at 1210, highlight recovery may be performed to prevent false colors from bleeding into surrounding regions after being filtered by the horizontal and vertical scalers. As indicated at 1220, the sensor format data (e.g., Bayer format data) may then be demosaiced to generate RGB color space data. In some embodiments, green pixels may also be adjusted according to the GNU detection performed at 1200. As indicated at 1230, horizontal filtering may be applied to resample and downsize the RGB data in the horizontal direction. As indicated at 1240, the RGB output from the horizontal filter is converted to YCC, chroma 4:4:4 format. As indicated at 1250, the chroma 4:4:4 is then horizontally filtered and decimated to generate chroma 4:2:2 output. As indicated at 1260, vertical filtering may be applied separately to the luma and chroma components to resample and downsize the YCC data in the vertical direction. As indicated at 1270, the chroma 4:2:2 data may then be horizontally interpolated to generate missing chroma values for the chroma 4:4:4 data. The YCC data is then converted back to RGB, as indicated at 1280. The RGB data is then remosaiced to generate vertically and horizontally downsampled sensor format data (e.g., Bayer format data) as output to the ISP pipeline.

Figure 5:
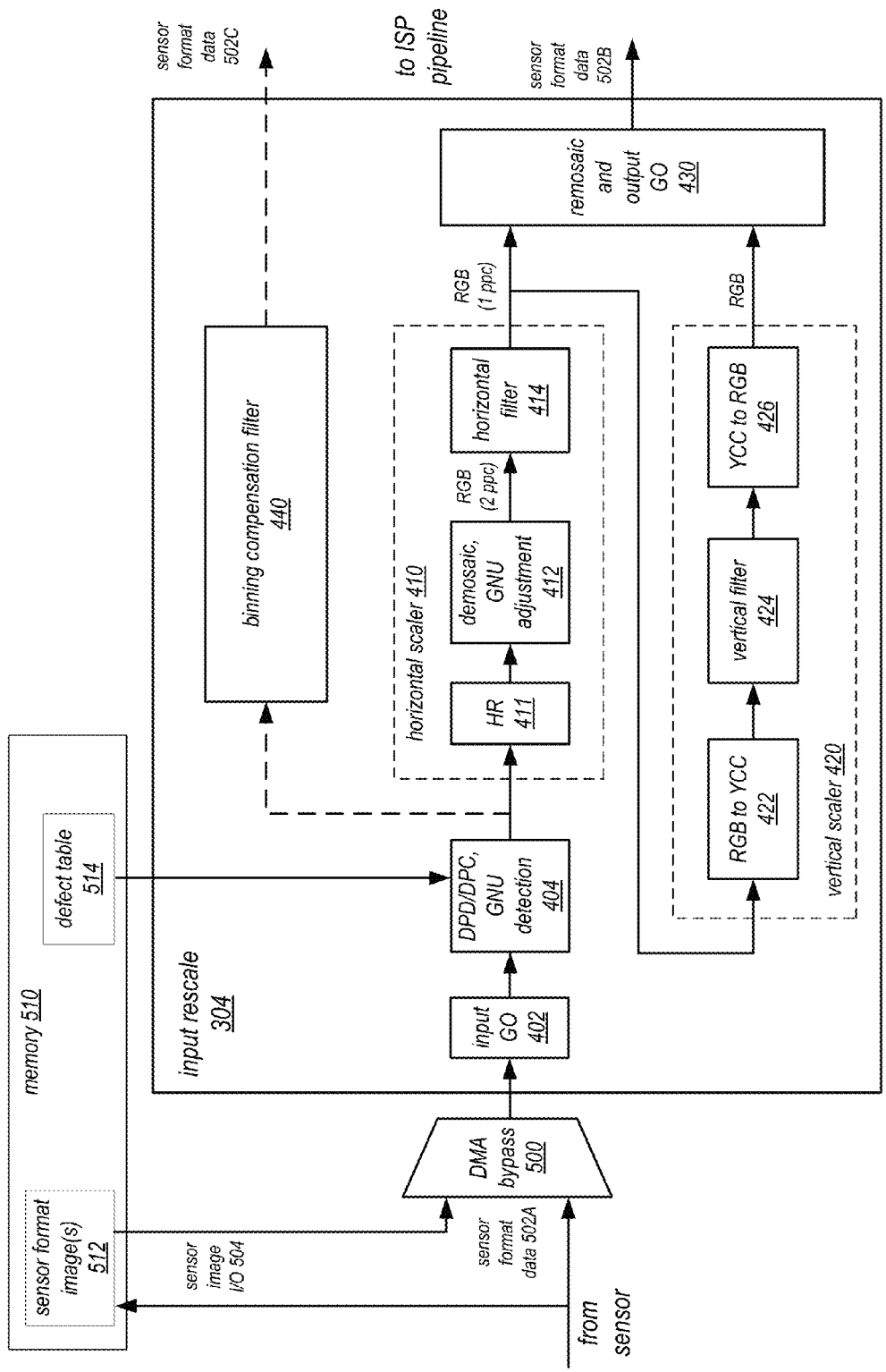
FIG. 5 is a more detailed block diagram of an example input rescale module, according to at least some embodiments.

FIG. 5 is a more detailed block diagram showing components of an example input rescale module 304 that may perform a method for cross-color correlated downscaling in the horizontal and vertical dimensions, according to at least some embodiments. The input rescale module 304 may, for example, implement the method as illustrated in FIG. 11. The input rescale module 304 may be used, for example, to horizontally and vertically downscale full-resolution sensor images (e.g., 8 megapixel or higher) to a smaller size (e.g., a 2 megapixel video format resolution) early in or prior to the ISP 106 pipeline to reduce the power and bandwidth cost of processing smaller image formats in the ISP 106 pipeline such as video formats without having to resort to binning on the sensor. In some embodiments, the input rescale module 304 may also handle binning compensation. In some embodiments, the input rescale module 304 may also perform as a horizontal-only scaler for the ISP 106 pipeline.

FIG. 5 shows an example input rescale module 304 in the context of an ISP 106 as illustrated in FIG. 3, which may be implemented in a system 100 as illustrated in FIG. 1. Referring to FIG. 3, in at least some embodiments, input rescale module 304 may be located between sensor interface 302 and the rest of the ISP 106 pipeline. In some embodiments, as shown in FIG. 5, a DMA bypass 500 may be located between the sensor 102/sensor interface 302 and the input rescale module 304. In some embodiments, output of input rescale module 304 may be passed to raw image processing module 308 and/or to image statistics module 306. As shown in FIG. 5, in at least some embodiments, input rescale module 304 may accept two pixels per clock from a camera/image sensor 102 or from a memory 510 (e.g., via DMA), and may output at most one pixel per clock to the rest of the ISP 106 pipeline.

Referring to FIG. 5, example input rescale module 304 may include front end components including but not limited to an input GO 402 component and a DPD/DPC, GNU detection 404 component; a horizontal scaler 410 path; a vertical scaler 420 path; and a remosaic and output GO component 430. In some embodiments, input rescale module 304 may also include a binning compensation filter 440 path. Horizontal scaler 410 path may include, but is not limited to, a highlight recovery (HR) 411 component, a demosaic 412 component, and a horizontal filter 414 component. Vertical scaler 420 path may include, but is not limited to, an RGB to YCC 422 component, a vertical filter 424 component, and a YCC to RGB 426 component. The following describes components of an example input rescale module 304 as shown in FIG. 5 in more detail. Note, however, that FIG. 5 is not intended to be limiting. An input rescale module 304 may include more, fewer, or different components than shown in FIG. 5, and the components of an input rescale module 304 may be arranged differently than as shown in FIG. 5.

DMA Bypass

In some embodiments, as shown in FIG. 5, a DMA bypass 500 may be located between the sensor interface 302 and the input rescale module 304. The DMA bypass 500 allows sensor format data 502A from a camera/image sensor 102 to be forked out to a memory 510 (e.g., dynamic random access memory (DRAM)), for example to allow raw images 512 from the sensor 102 that are being processed by the ISP 106 pipeline as video to also be stored for subsequent processing as higher- or full-resolution still images. In addition, the input rescale module 304 may read or receive sensor format images 512 from memory 510 instead of from the sensor 102 path. In some embodiments, both the memory 510 write and read paths can handle up to two pixels per clock to facilitate running the sensor 102 and input rescale module 304 at or near maximum throughput.

Input Gain and Offset (Input GO)

In some embodiments, input rescale module 304 may include an input GO 402 component that receives and processes sensor format data 502A from DMA bypass at two pixels per cycle. Since one or more components of the input rescale module 304 use cross-color information, a first step in input rescale module 304 processing is to remove the black level and gain from the input so that the color channels are in approximate white balance. In at least some embodiments, this may be done with a bias and gain function implemented by input GO 402. In some embodiments, the output is clamped to the range of the ISP 106 pipeline (referred to herein as the pipe range).

Front-End Line Buffering

Figure 6:
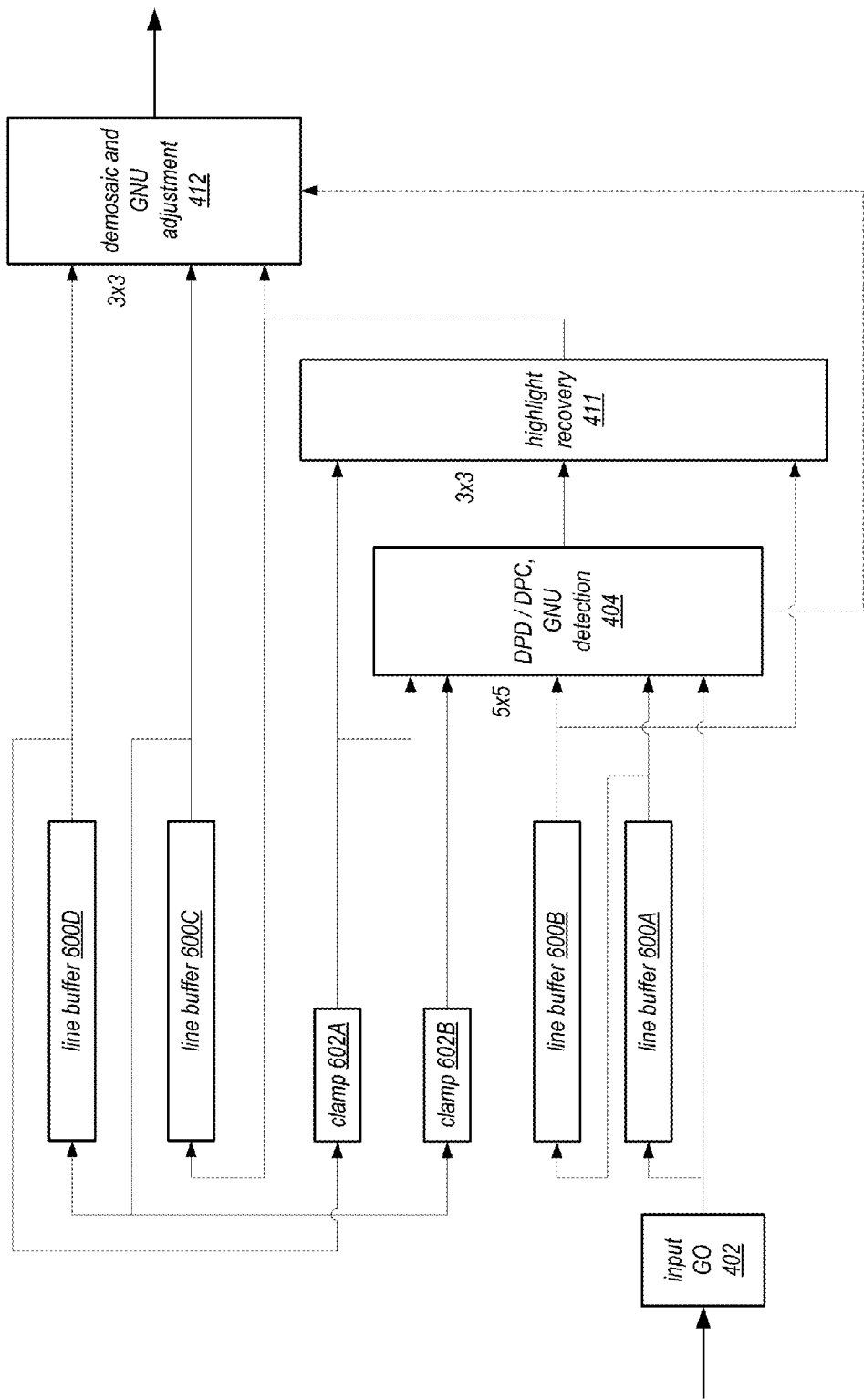
FIG. 6 is a block diagram of a front end portion of an example input rescale module, according to at least some embodiments.

Referring to FIG. 5, in some embodiments, a front-end portion of input rescale module 304 prior to horizontal filter 414 may include components 404, 411, and 412 that perform defective pixel detection (DPD), defective pixel correction (DPC), green non-uniformity (GNU) detection (component 404), highlight recovery (HR 411), and demosaicing and GNU adjustment (component 412). FIG. 6 is a block diagram showing more detail of the front-end portion of an example input rescale module 304, according to at least some embodiments. In some embodiments, the front-end DPC/DPD, GNU detection 404 component, HR 411 component, and demosaicing and GNU adjustment 412 component may share a unified five-line support composed of four line buffers 600A-600D. Two of these line buffers (600A-B) hold buffered input pixels and two (600C-600D) hold lines that have had DPC and HR already applied.

Figure 8:
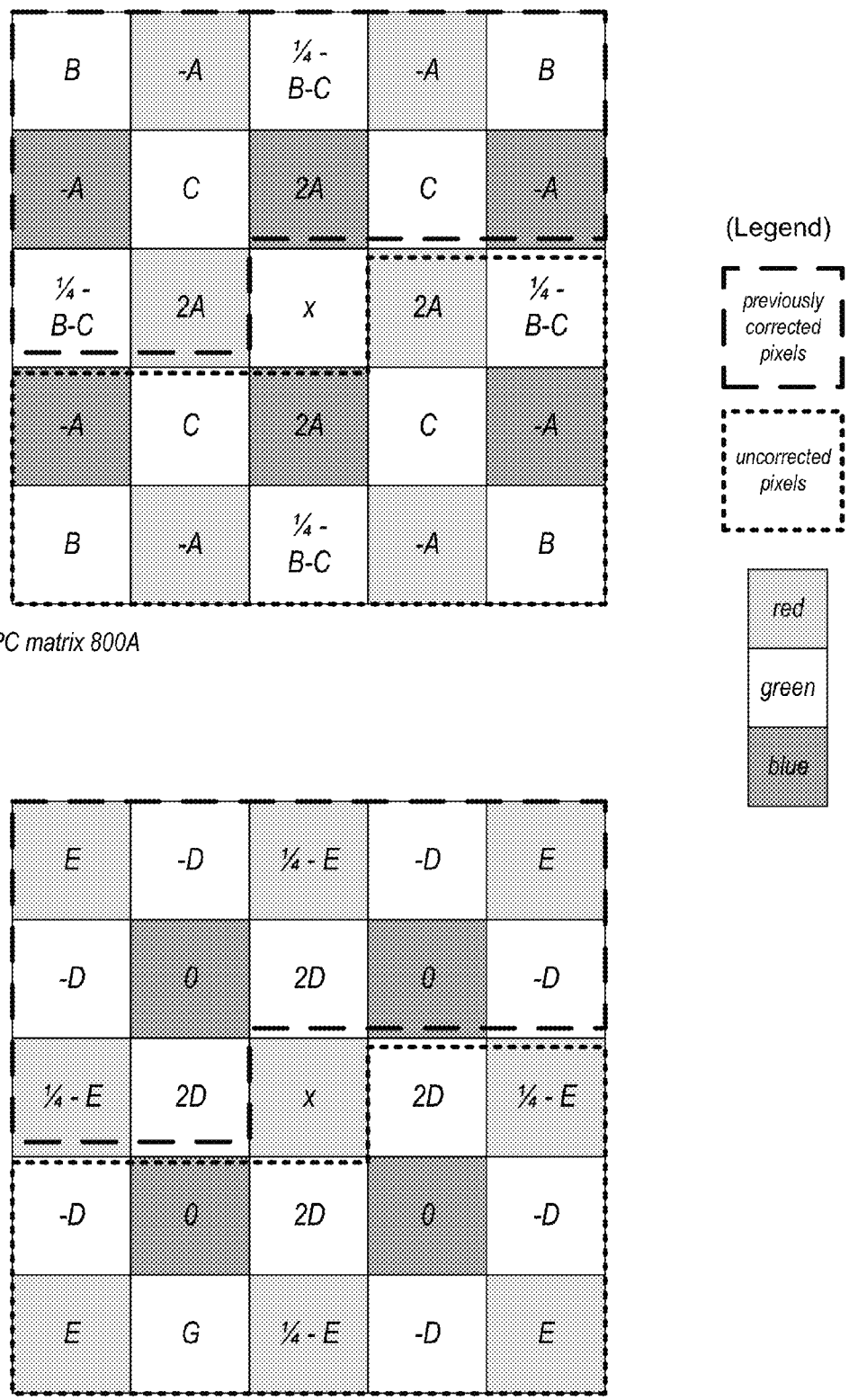
FIG. 8 shows example defective pixel correction (DPC) matrices for green and non-green pixels, according to at least some embodiments.
Figure 9:
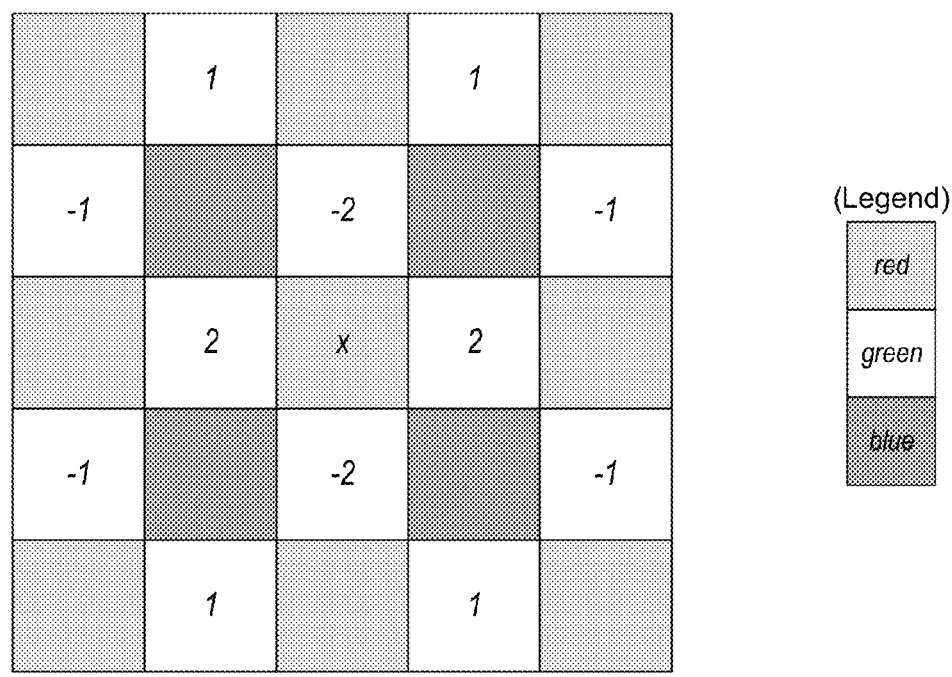
FIG. 9 shows an example green non-uniformity (GNU) detection kernel, according to at least some embodiments.
Figure 10:
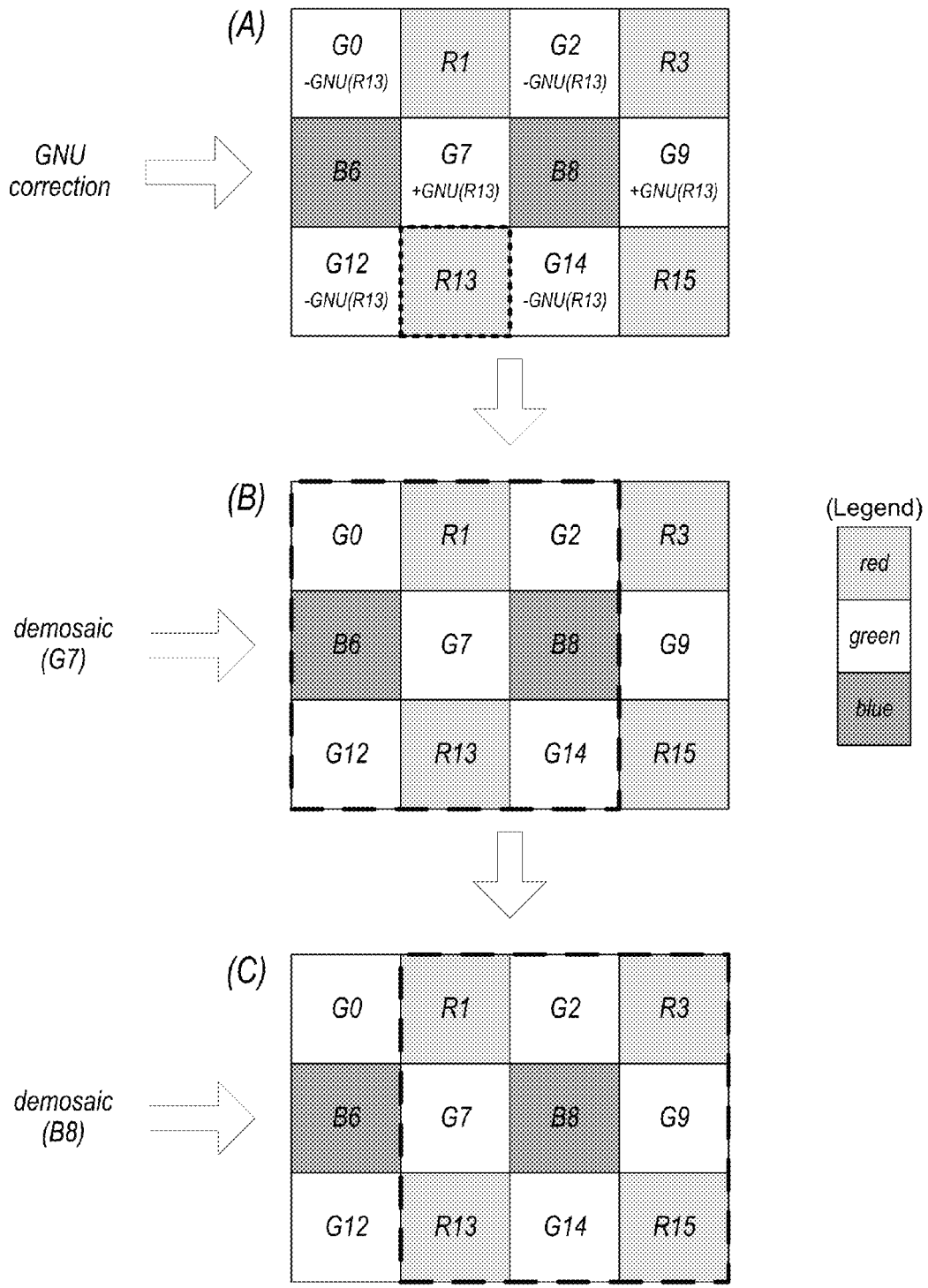
FIG. 10 shows example pixels to illustrate green non-uniformity (GNU) correction and demosaicing operations, according to at least some embodiments.

In some embodiments, DPC/DPD and GNU detection 404 use a 5×5 matrix or kernel to perform defect detection, defect correction and green non-uniformity detection, for example as illustrated in FIGS. 8 and 9. In some embodiments, since the top two lines of the 5×5 kernel have already had highlight recovery (HR) 411 performed on them, these lines may be clamped 602 back to the original pipe range before being input to the DPD/DPC, GNU detection 404 and HR 411 components. In some embodiments, the HR 411 and demosaic/GNU adjustment 412 components use a 3×3 matrix or kernel, as illustrated in FIG. 10. In some embodiments, for HR 411 component, the top line will already have HR applied and will need to be clamped 602A; the bottom line will not have had DPC applied. In some embodiments, the detected GNU value is pipelined along with the data and applied to the greens in the 3×3 demosaic kernel before doing the demosaic operation, so that the demosaic 412 operation uses the detected GNU value from the following line.

DPD/DPC, GNU Detection Component

In some embodiments, input rescale module 304 may include a component 404 that performs defective pixel detection (DPD), defective pixel correction (DPC), and green non-uniformity (GNU) detection prior to demosaic 412. Component 404 may itself contain one or more blocks or subcomponents that perform DPD, DPC, and GNU detection.

Defective Pixel Detection (DPD)

Referring to FIG. 5, in some embodiments of input rescale module 304, a static detection block of DPD may use a static defect table 514 accessed from memory 510 to determine which pixels to correct. In some embodiments, the defect table 514 used by the static detection block may be generated by a defective pixel detection and correction component of the main ISP 106 pipeline. In some embodiments, pixels that are detected by the static detection block may have their value replaced with the previous (left) value of the pixel with the same color prior to dynamic defect detection (see below) and DPC, unless the previous pixel is outside of the raw frame.

In some embodiments, DPD may also implement a dynamic defect detection block that may be used in conjunction with static detection block to correct additional defects, in particular hot pixels that are not included in the static defect table 514. Previously corrected pixels are used in the detection/correction of the current pixel. If the pixel was marked as defective in the static defect table 514, it is replaced by its memorized value prior to dynamic defect detection. In some embodiments, defective pixels may be detected using directional gradients determined for a pixel from the eight immediate neighbors of the same color.

Defective Pixel Correction (DPC)

In some embodiments of input rescale module 304, two modes are available for defect correction. A first mode finds the smallest gradient in the neighbors of the same color and corrects the pixel using the interpolated color. A second mode corrects defective pixels using a linear combination of surrounding 5×5 neighborhood of pixels using two symmetric kernels that are determined by five programmable weights. In some embodiments, green and non-green pixels use two different matrices. FIG. 8 shows example defective pixel correction (DPC) matrices for green pixels (matrix 800A) and non-green pixels (matrix 800B) that may be used in some embodiments. In matrix 800A and matrix 800B of FIGS. 8, A, B, C, D and E are programmable coefficients, and the pixels marked x are the center or current pixels being corrected. In some embodiments the same values are used for both red and blue corrections.

In some embodiments, both statically- and dynamically-detected defective pixels may be replaced. In some embodiments, static defective pixel positions are buffered for the two-line delay between input (where the pixel may be replaced with the previous non-defective pixel of the same color) and DPC. In some embodiments, referring to matrix 800A and matrix 800B of FIG. 8, 5×5 support for DPC consists of 12 uncorrected pixels (those below and to the right of the center pixel x) and 12 previously corrected pixels (those above and to the left of the center pixel). The pixels in the two lines above the line that includes the center pixel x were corrected when the component 404 was processing the previous lines. In some embodiments, in some cases when processing center pixel x, the corrected pixel values may not be available for the two pixels to the immediate left of the pixel x; for example, those pixels may have been found to be defective. In these cases, corrected pixel value(s) from the two rows above the center pixel x may instead be used for computing a correction value for pixel x. When processing the top row(s) of an image, pixel value(s) from two pixels further to the left may be used instead.

Green Non-uniformity (GNU) Detection

FIG. 9 shows an example green non-uniformity (GNU) detection kernel, according to at least some embodiments. In some embodiments, when centered on non-green pixels, a 5×5 green non-uniformity (GNU) detection kernel 900 may be used to compute a GNU adjustment value for use in the demosaic 412. In some embodiments, the kernel sum is scaled and clamped by a programmable GNU limit value to produce the GNU adjustment value, which is the amount by which the Gr and Gb values may be adjusted to move them towards the green average. In some embodiments, this GNU adjustment value is pipelined forward and used to adjust the greens in the two 3×3 demosaic kernels centered on the line above and the pixel above and to the right. As an example, referring to FIG. 10 (A), the GNU adjustment value computed at red pixel R13 may be used to adjust the green pixels G7 and G9.

Horizontal Scaler Path

As shown in FIG. 5, input rescale module 304 may include a horizontal scaler 410 path. Horizontal scaler 410 path may include a highlight recovery (HR) 411 component, a demosaic 412 component, and a horizontal filter 414 component.

Highlight Recovery

In some embodiments of an input rescale module 304, highlight recovery (HR) is performed by an HR 411 component before demosaic 412 to prevent false colors in clamped pixels from bleeding into surrounding regions after being filtered by the horizontal and vertical scalers. In some embodiments, HR 411 replaces the values of clamped pixels with an estimate based on the other color components in the neighborhood. In some embodiments, HR is performed on each pixel in the 3×3 region that will be used for demosaic 412. For each pixel in the region, the following function is evaluated to do HR:

Demosaic and Green Non-uniformity (GNU) Adjustment

In some embodiments of an input rescale module 304, a demosaic and GNU adjustment component 412 performs a demosaic operation with GNU adjustment on the sensor format data (e.g., Bayer format data) to generate RGB output for horizontal filter 414. In some embodiments, the demosaic operation works on 3×3 blocks of pixels to estimate the two missing color channels for each pixel. Component 412 may itself contain one or more blocks or subcomponents that perform demosaic and GNU adjustment operations. FIG. 10 shows example pixels to illustrate green non-uniformity (GNU) correction and demosaicing operations in a demosaic and GNU adjustment component 412, according to at least some embodiments.

As previously described, GNU detection may be performed for pixels at component 404 to calculate GNU adjustment values at the pixels. At component 412, the GNU adjustment values for the pixels may be used to adjust nearby green pixels prior to demosaicing the pixels. For example, referring to the example 4×3 pixel region in FIG. 10 (A), the GNU adjustment value computed at red pixel R13 (denoted as GNU(R13)) may be added to the green pixels G7 and G9 on the middle row of the region, and may also be subtracted from the green pixels on the top and bottom rows of the region (G0, G2, G12, and G14).

In some embodiments, as shown in FIGS. 10 (B) and (C), the demosaic operation works on 3×3 blocks of pixels to estimate the two missing color channels for each pixel. In some embodiments, the demosaic operation generates estimates of the missing colors for a pixel (e.g., red and blue for each green pixel, red and green for a blue pixel, and blue and green for a red pixel) by interpolating from other pixels in the 3×3 region along each of the cardinal directions. These direction-dependent estimates are blended according to a blending function to produce the final output.

Horizontal Filter

In some embodiments, the horizontal filter 414 component applies a polyphase horizontal resampling filter to the RGB data output from demosaic 412 to resample and downsize the RGB stream in the horizontal direction. In some embodiments, the filter may downscale the input using a downscale factor between 0.5 and 1.0, generating the pixel positions and filter phases with a digital differential analyzer (DDA).

In some embodiments, the horizontal filter 414 is the point in the input rescale module 304 where the rate conversion from two pixels per clock to one pixel per clock is done. In some embodiments, the horizontal filter 414 accepts up to two pixels per clock on its input, but produces at most one pixel per clock on its output. This means that the combination of the actual input rate (after accounting for cycles with no valid data), the actual output rate, and the horizontal decimation factor must all correspond to a valid combination or otherwise the result is undefined. For example, if the camera is providing two pixels per clock with no invalid cycles, the horizontal scaler must be programmed to a 2:1 downscale ratio so that it can consume all of the input data and correspondingly output one valid pixel every clock to the downstream.

Vertical Scaler Path

As shown in FIG. 5, input rescale module 304 may include a vertical scaler 420 path. Vertical scaler 420 path may include an RGB to YCC 422 component, a vertical filter 424 component, and a YCC to RGB 426 component.

RGB to YCC

In some embodiments of an input rescale module 304, an RGB to YCC 422 component converts from RGB 4:4:4 to YCC 4:2:2, for example to save hardware (e.g., line buffer) space and power consumption, and also to allow the luma and chroma components to be differently filtered. In some embodiments, RGB to YCC 422 component first converts the RGB to YCC, chroma 4:4:4 format. The chroma (Cr/Cb) stream is then downscaled and decimated by a factor of two to produce chroma 4:2:2.

Vertical Filter

In some embodiments, the vertical filter 424 component downscales vertically by a factor between 0.5 and 1.0, in a manner similar to the horizontal scaler using a polyphase vertical resampling filter, and using a digital differential analyzer (DDA) to generate filter coordinates and phases. In some embodiments, vertical filter 424 component may apply more aggressive filtering to the chroma data than are applied to the luma data to reduce false color artifacts while maintaining the resolution and sharpness of the image signal.

YCC to RGB

In some embodiments of an input rescale module 304, a YCC to RGB 426 component essentially does the inverse of the RGB to YCC 422 component. In some embodiments, the YCC to RGB 426 component converts from chroma 4:2:2 to chroma 4:4:4 by interpolating the missing chroma values, for example using a symmetric folded half-phase interpolation filter. Then the YCC to RGB 426 component converts from YCC back to RGB. In some embodiments, since the subsequent remosaic operation will discard all but one of the output colors, only one of the RGB components needs to be computed.

Remosaic and Output GO

In some embodiments of an input rescale module 304, a remosaic 430 component converts RGB data to sensor format data (e.g., Bayer format data) for output to the ISP 106 pipeline. In some embodiments, to remosaic the RGB data, remosaic 430 component emits our outputs one of the color channels for each pixel based on the current Bayer phase, discarding the other two color channels for the pixel. For example, if the Bayer phase is at a red pixel, the remosaic 430 component emits only the red channel for the pixel, discarding the blue and green channels. In some embodiments, the remosaic 430 component may receive RGB results from the vertical scaler 420 path and remosaic the results to generate horizontally and vertically downscaled sensor format data 502B as output. In some embodiments, the remosaic 430 component may optionally receive RGB results directly from the horizontal scaler 410 path to generate horizontally downscaled sensor format data 502B, bypassing the vertical path 420 in cases where only horizontal downscaling is desired or required.

In some embodiments, gain and offset (GO) may be applied to the remosaiced data to reverse the effect of the input gain and offset performed at component 402, generating the final sensor format data 502B.

Binning Compensation Filter

In some embodiments of an input rescale module 304, in addition to horizontal scaler 410 and vertical scaler 420 paths that perform cross-color correlated downscaling, the input rescale 304 module may include a binning compensation filter 440 path that may perform cross-color correlated binning compensation when sensor binning has been applied to input sensor format data 502A. In some embodiments, the binning compensation filter 440 path bypasses most of the input rescale 304 pipeline, instead taking sensor format (e.g., Bayer format) pixels from the DPD/DPC 404 component and performing binning compensation before passing the resulting sensor format data 502C off to the ISP 106 pipeline. In some embodiments, the binning compensation filter 440 may share some hardware (e.g., line buffers) with the horizontal scaler 410 and/or the vertical scaler 420.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
an image signal processor comprising an image processing pipeline for processing images captured by an image sensor; and
an input rescale module configured to:
receive image data for an image according to a Bayer filter format that represents different color channels as separate pixels;
convert the image data from the Bayer filter format to an RGB color space; and
convert the image data from the RGB color space to a YCC color space that separates luma and chroma components of the data;
apply vertical filtering to the luma and chroma components of the image data to downscale the image data in the vertical dimension, wherein a different vertical filter is applied to the chroma data than is applied to the luma data;
convert the downscaled image data to the Bayer filter format; and
output the downscaled image data in the Bayer filter format to the image processing pipeline of the image signal processor.

2. The apparatus as recited in claim 1, wherein the input rescale module is further configured to apply horizontal filtering to the image data to horizontally downscale the image data prior to said converting the image data from the RGB color space to the YCC color space.

3. The apparatus as recited in claim 1, wherein, to convert the downscaled image data to the Bayer filter format, the input rescale module is further configured to:
convert the downscaled image data from the YCC color space to the RGB color space; and
convert the downscaled image data from the RGB color space to the Bayer filter format.

4. The apparatus as recited in claim 1, wherein the input rescale module is configured to:
convert the chroma data from chroma 4:4:4 format to chroma 4:2:2 format prior to applying vertical filtering to the chroma data; and
convert the chroma data from chroma 4:2:2 format to chroma 4:4:4 format after applying vertical filtering to the chroma data.

5. An method, comprising:
converting, by an input rescale module, image data received according to an image sensor format that represents different color channels as separate pixels to a YCC color space that separates luma and chroma components of the data;
applying vertical filtering to the luma and chroma components of the image data to vertically downscale the image data, wherein a different vertical filter is applied to the chroma data than is applied to the luma data;
converting the downscaled image data to the image sensor format; and
outputting the downscaled image data in the image sensor format to the image processing pipeline of the image signal processor.

6. The method as recited in claim 5, wherein, in said vertical filtering, a stronger filter is applied to the chroma data than is applied to the luma data to reduce false color artifacts from the demosaic function without affecting edge sharpness provided by the luminance data.

7. The method as recited in claim 5, wherein converting the received image data to the YCC color space comprises:
converting the image data from the image sensor format to an RGB color space; and
converting the image data from the RGB color space to the YCC color space.

8. The method as recited in claim 7, further comprising applying horizontal filtering to the image data to horizontally downscale the image data prior to said converting the image data from the RGB color space to the YCC color space.

9. The method as recited in claim 7, wherein converting the downscaled image data to the image sensor format comprises:
converting the downscaled image data from the YCC color space to the RGB color space; and
converting the downscaled image data from the RGB color space to the image sensor format.

10. The method as recited in claim 7, wherein converting the image data from the image sensor format to an RGB color space comprises applying a demosaic operation to 3×3 pixel blocks of the image data to interpolate missing color channels for the pixels.

11. The method as recited in claim 5, further comprising, prior to applying vertical filtering to the chroma data, converting the chroma data from chroma 4:4:4 format to chroma 4:2:2 format.

12. The method as recited in claim 11, wherein converting the chroma data from chroma 4:4:4 format to chroma 4:2:2 format comprises applying a horizontal filter to the chroma 4:4:4 format data to resample and downsize the chroma data to chroma 4:2:2 format.

13. The method as recited in claim 11, further comprising, after applying vertical filtering to the chroma data, converting the chroma data from chroma 4:2:2 format to chroma 4:4:4 format.

14. The method as recited in claim 13, wherein converting the chroma data from chroma 4:2:2 format to chroma 4:4:4 format comprises horizontally interpolating the chroma 4:2:2 format data to generate missing chroma values for the chroma 4:4:4 format data.

15. The method as recited in claim 5, wherein the image sensor format is a Bayer filter format in which each block of four pixels includes two green pixels, one red pixel, and one blue pixel.

16. A device, comprising:
- an image sensor configured to capture images according to a Bayer filter format that represents different color channels as separate pixels;
- an image signal processor configured to process Bayer filter format images captured by the image sensor to generate output images in a different format, the image signal processor comprising an image processing pipeline that implements a plurality of stages each configured to perform one or more operations on image data passing through the pipeline; and
- an input rescale module located between the photosensor and the image processing pipeline and configured to:
  - apply a demosaic function to Bayer filter format image data captured by the image sensor to convert the image data to an RGB color space;
  - apply a horizontal filter to the RGB data to horizontally downscale the RGB data;
  - convert the RGB data to a YCC color space that separates luma and chroma components of the data;
  - apply vertical filtering separately to the luma and chroma components of the image data to downscale the image data in the vertical dimension;
  - convert the YCC data to the RGB color space;
  - apply a remosaic function to convert the horizontally and vertically downscaled RGB data to the Bayer filter format; and
  - output the horizontally and vertically downscaled Bayer filter format data to a stage of the image processing pipeline.

17. The device as recited in claim 16, wherein the input rescale module is configured to:
- convert the chroma data from chroma 4:4:4 format to chroma 4:2:2 format prior to applying vertical filtering to the chroma data; and
- convert the chroma data from chroma 4:2:2 format to chroma 4:4:4 format after applying vertical filtering to the chroma data.

18. The device as recited in claim 16, wherein, in said vertical filtering, a stronger filter is applied to the chroma data than is applied to the luma data to reduce false color artifacts from the demosaic function without affecting edge sharpness provided by the luminance data.

19. The device as recited in claim 16, further comprising a memory configured to store raw images as captured by the image sensor, wherein the input rescale module is configured to receive the Bayer filter format image data from the image sensor or from the memory.

20. The device as recited in claim 16, wherein the input rescale module is a component of the image signal processor.

* * * * *